UNITED STATES PATENT OFFICE.

KARL JEDLICKA, OF BASLE, SWITZERLAND, ASSIGNOR TO THE SOCIETY OF CHEMICAL INDUSTRY IN BASLE, OF SAME PLACE.

GREEN TRIAZO DYE.

SPECIFICATION forming part of Letters Patent No. 585,104, dated June 22, 1897.

Application filed August 21, 1896. Serial No. 603,492. (Specimens.)

*To all whom it may concern:*

Be it known that I, KARL JEDLICKA, a citizen of the Swiss Republic, residing at Basle, Switzerland, have invented certain Improvements in the Manufacture of Green Substantive Cotton Dyestuffs, of which the following is a clear and complete specification.

The present invention is based on the observation that the red monoazo coloring-matters derived from one molecule of a diazobenzoic-acid compounds (chlorids or other salts of diazobenzoic acids and its ethers or amids) and one molecule of an amidonaphtholdisulfonic acid—as, for instance, amidonaphtholdisulfonic acid 1.8,3.6.—produce valuable and successful green triazo dyestuffs when one molecule of the tetrazo derivative of a paradiamido base of the series of diphenyl—such, for example, as benzidin, tolidin, dianisidin, methylbenzidin, and ethoxylbenzidin—is combined with one molecule of the said red monoazo coloring-matters and one molecule of a phenolic compound—such, for example, as phenol, orthocresol, metacresol, resorcin, and cresotinic acid. These triazo dyestuffs, which all contain three diazo groups, are all powders of bronze luster. They dye unmordanted cotton from dark green to yellowish green in an alkaline bath, also wool in an acid bath and on mordants of chromium. The preparation of these new triazo coloring-matters is preferably executed in three successive operations, comprising, first, the production of the red monoazo coloring-matter derived from an amidonaphtholdisulfonic-acid and a diazobenzoic-acid compound; second, the combination of one molecule of the red monoazo coloring-matter thus obtained with one molecule of the tetrazo derivative of a paradiamido base of the series of diphenyl, and, third, the combination of one molecule of the intermediate product thus formed with one molecule of a phenolic compound.

By way of example I will now describe the production of the dark-green triazo dyestuff derived from metadiazobenzoic acid, amidonaphtholdisulfonic acid 1.8.3.6, tetrazoditolyl, and phenol.

I. *Preparation of the monoazo coloring dye derived from metadiazobenzoic acid and amidonaphtholdisulfo acid 1.8.3.6.*—6.9 kilograms meta-amidobenzoic acid are dissolved in about two hundred liters water, to which fifteen kilograms hydrochloric acid of thirty per cent. have been added, and diazotized by means of 3.5 kilograms sodium nitrite at a temperature of 5° to 10° centigrade. The solution of metadiazobenzoic acid thus obtained is poured into a solution of sixteen kilograms amidonaphtholdisulfonic acid 1.8:3.6 and of 2.7 kilograms of sodium carbonate in about two hundred liters water, care being taken to agitate and to cool the mixture. The product of reaction separates as brown-red flakes. The mixture is advantageously let stand for about ten hours for accomplishing the reaction.

II. *Preparation of the intermediate product.*—The mixture obtained as set forth under I, and in which the primary monoazo coloring-matter is suspended, has first added to it twenty kilograms of sodium carbonate, whereby an intense red-colored alkaline solution of the monoazo coloring-matter is obtained. This solution is cooled with ice to about 10° centigrade and then is mixed with the solution of tetrazoditolyl prepared in the known manner from 10.6 kilograms tolidin, care being taken to agitate the liquid. The intermediate product formed at the end of about one-half hour remains entirely dissolved. The solution has an intense black-violet color. On adding common salt thereto the intermediate product may be precipitated in the form of black flakes, but its separation for further use is not necessary.

III. *Combination of one molecule of the intermediate product*

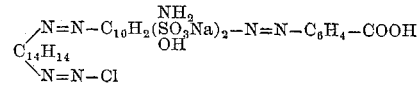

*with one molecule of phenol.*—4.7 kilograms phenol are dissolved in water, which has added to it five kilograms of sodium carbonate, and the alkaline solution of phenol thus obtained is mixed with the black-violet solution of the intermediate product obtained as set forth under II. The mixture is let stand for about twenty hours, after which it is heated to about 80° centigrade and the dyestuff precipitated with sea-salt. The precipitate is then collected and dried. The dyestuff is in its dry state a powder of bronze luster, which is insoluble in alcohol, in ether, and in benzene and easily soluble in water with green coloration. It dyes unmordanted cotton in an alkaline bath in intense green tints, fast to light and especially to alkalies. Its solution in concentrated sulfuric acid is dirty-blue violet. By adding an acid to its aqueous solution the dyestuff acid is precipitated. It dyes also wool in acid bath or on mordants of chromium.

According to the described process a series of new green dyestuffs can be prepared by substituting for the metadiazobenzoic acid in the method described under I the isomeric para and ortho diazobenzoic acids or the amido derivatives of the diazobenzoic acids (the combination of these diazo bodies with amidonaphtholdisulfonic acid being effected in an acid solution) by combining the monoazo coloring-matters thus obtained, according to method described under II, with tetrazotolyl, and combining, finally, the resulting intermediate products, according to the method described under III, with phenol.

For the purpose of producing the intermediate products the tetrazoditolyl can also be replaced by the tetrazo derivatives of benzidin, of methylbenzidin, of ethoxybenzidin, and of dianisidin. Finally, other phenolic compounds—as, for instance, orthocresol, metacresol, resorcin, orthocresotinic acid, (oxytoluic acid)—can be substituted for the phenol, and the amidonaphtholdisulfonic acid 1.8.3.6 can be replaced in certain cases by the isomeric amidonaphtholdisulfo acids 1.8.4.6 and 1.5.3.7.

A great variety of dyestuffs can thus be produced, which dye in all tints from black-green to yellowish green. All these dyestuffs, which are characterized as derivatives of the diazobenzoic acids, may be represented by the general formula

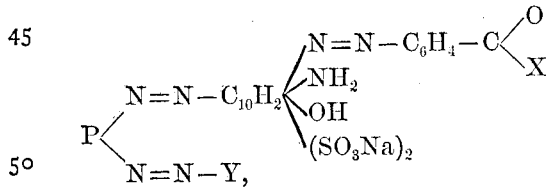

where X is to designate a hydroxyl, alkyloxy, or amido group, P the radical of the tetrazo derivative of a paradiamin of the series of diphenyl, and Y a phenolic compound. They are, in dry state, powders of bronze luster, soluble in water with coloration varying from dark-green to yellowish green, insoluble in alcohol, ether, and benzene, soluble in concentrated sulfuric acid with dirty-blue-violet coloration. The addition of an acid to their aqueous solution produces a precipitate of the dyestuff acid.

What I claim is—

1. The herein-described process for the manufacture of new green triazo dyestuffs, which consists in combining one molecule of the tetrazo derivative of a paradiamido base of the series of diphenyl with one molecule of a monoazo coloring-matter derived from one molecule of an amidonaphtholdisulfonic acid and one molecule of a diazobenzoic-acid compound and one molecule of a phenolic compound such for instance, as phenol, cresol, resorcin and cresotinic acid, as set forth.

2. The herein-described process for the manufacture of new green triazo dyestuffs, which consists in combining one molecule of the tetrazo derivative of a paradiamido base of the series of diphenyl, with one molecule of the monoazo coloring-matter derived from one molecule amidonaphtholdisulfonic acid 1.8.3.6 and one molecule of metadiazobenzoic-acid compound, and with one molecule of a phenolic compound, such for instance as phenol, resorcin, cresol and cresotinic acid, as set forth.

3. The herein-described process for the manufacture of new green triazo dyestuffs, which consists in combining one molecule of the tetrazo derivative of a paradiamido base of the series of diphenyl, with one molecule of the monoazo coloring-matter derived from one molecule of amidonaphtholdisulfonic acid 1.8.3.6, with one molecule of metadiazobenzoic-acid compound, and with one molecule of phenol, as set forth.

4. As a new article of manufacture, the herein-described green triazo dyestuff, which is, in its dry state, a powder of bronze luster, insoluble in alcohol, ether and benzene, soluble in water with a green coloration, and capable of dyeing unmordanted cotton in dark-green to yellowish-green tints, fast to light and especially to alkalies, and which, when dissolved in concentrated sulfuric acid, imparts a dirty-blue-violet color to the solution, as set forth.

In witness whereof I have hereunto signed my name in the presence of two subscribing witnesses.

KARL JEDLICKA.

Witnesses:
 GEORGE GIFFORD,
 AUGUST ROOS.